(12) United States Patent
Canpolat et al.

(10) Patent No.: US 12,439,289 B2
(45) Date of Patent: Oct. 7, 2025

(54) SIGNALLING SUPPORT FOR REDUNDANCY CAPABILITIES FOR EHT

(71) Applicant: Intel Corporation, Santa Clara, CA (US)

(72) Inventors: Necati Canpolat, Beaverton, OR (US); Juan Fang, Portland, OR (US); Ganesh Venkatesan, Hillsboro, OR (US); Chittabrata Ghosh, Fremont, CA (US); Dave A. Cavalcanti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 17/925,129

(22) PCT Filed: Jul. 23, 2021

(86) PCT No.: PCT/US2021/042896
§ 371 (c)(1),
(2) Date: Nov. 14, 2022

(87) PCT Pub. No.: WO2022/020677
PCT Pub. Date: Jan. 27, 2022

(65) Prior Publication Data
US 2023/0199546 A1    Jun. 22, 2023

Related U.S. Application Data

(60) Provisional application No. 63/133,645, filed on Jan. 4, 2021, provisional application No. 63/056,019, filed on Jul. 24, 2020.

(51) Int. Cl.
*H04W 28/02* (2009.01)
*H04L 1/08* (2006.01)
*H04W 8/24* (2009.01)

(52) U.S. Cl.
CPC .......... *H04W 28/0231* (2013.01); *H04L 1/08* (2013.01); *H04W 8/24* (2013.01); *H04W 28/0215* (2013.01)

(58) Field of Classification Search
CPC .... H04L 1/08; H04L 1/1685; H04W 28/0215; H04W 28/0231; H04W 48/12; H04W 8/24; H04W 84/12; H04W 88/06
See application file for complete search history.

(56) References Cited

U.S. PATENT DOCUMENTS

2008/0219228 A1   9/2008  Seok et al.
2010/0165906 A1   7/2010  Chu et al.
(Continued)

FOREIGN PATENT DOCUMENTS

BR   112022026120   1/2023
CN   115943593      4/2023
(Continued)

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications", IEEE Computer Society, (Mar. 8, 2007), 298 pages.

(Continued)

*Primary Examiner* — Stephen J Clawson
(74) *Attorney, Agent, or Firm* — Schwegman Lundberg & Woessner, P.A.

(57) ABSTRACT

An extremely high-throughput (EHT) station (STA) encodes a management frame to include a quality-of-service (QoS) capability element that includes a QoS information field configured to signal QoS redundancy capability. The EHT STA may set a QoS redundancy bit in the QoS information field of the QoS capabilities element to indicate (i.e., signal)

(Continued)

| | B0 | B1 | B2 | B3 | B4 | B5 B6 | B7 | B8 | B9 B15 |
|---|---|---|---|---|---|---|---|---|---|
| | AC_VO U-APSD Flag | AC_VI U-APSD Flag | AC_BK U-APSD Flag | AC_BEU-APSD Flag | Q-ACK | Max SP Length | More Data ACK | QoS Redundancy | Reserved |
| BITS | 1 | 1 | 1 | 1 | 1 | 2 | 1 | 1 | 7 |

QoS Info Field for a STA that the EHT STA supports redundancy for QoS data frames. The EHT STA may include an Extended Capabilities element in the management frame and set a new redundancy indicator bit in the Extended Capabilities element to indicate (i.e., signal) that the EHT STA supports redundancy for a select subset of IEEE802.11 management frames.

20 Claims, 4 Drawing Sheets

(56) References Cited

U.S. PATENT DOCUMENTS

| | | | | |
|---|---|---|---|---|
| 2012/0281564 | A1* | 11/2012 | Zhang | H04L 1/1867 370/252 |
| 2015/0124689 | A1* | 5/2015 | Merlin | H04W 4/06 370/312 |
| 2018/0317128 | A1 | 11/2018 | Chun et al. | |
| 2020/0029350 | A1* | 1/2020 | Asterjadhi | H04W 28/18 |
| 2020/0084663 | A1* | 3/2020 | Park | H04W 8/08 |
| 2021/0076419 | A1* | 3/2021 | Naribole | H04W 56/001 |
| 2021/0120552 | A1* | 4/2021 | Fang | H04W 72/0446 |
| 2022/0240334 | A1* | 7/2022 | Wang | H04W 76/15 |
| 2022/0311568 | A1* | 9/2022 | Jang | H04L 1/00 |
| 2024/0291763 | A1* | 8/2024 | Viger | H04L 47/24 |

FOREIGN PATENT DOCUMENTS

| | | |
|---|---|---|
| EP | 2330782 A1 | 6/2011 |
| WO | WO-2022020677 A1 | 1/2022 |

OTHER PUBLICATIONS

"European Application Serial No. 21845855.2, Partial Supplementary European Search Report mailed Jul. 30, 2024", 9 pgs.

"European Application Serial No. 21845855.2, Extended European Search Report mailed Oct. 21, 2024", 9 pgs.

Dave, Cavalcanti, "Low latency service in 802.11be", 11-20-0418-03-00BE—Low-Latency-Service—IN-802-IIBE, IEEE-SA Entor, Piscataway, NJ USA, vol. 802.11 EHT; 802.11be, No. 3, [Online] Retrieved from the internet:https : mentor.ieee.org 802 .II dcn 20 11-20-0418-03-OObe-low-latency-service-in-802-llbe.pptx, (Jun. 25, 2020), 1-29.

"International Application Serial No. PCT US2021 042896, International Preliminary Report on Patentability mailed Feb. 2, 2023", 6 pgs.

"International Application Serial No. PCT/US2021/042896, International Search Report mailed Nov. 8, 2021", 3 pgs.

"International Application Serial No. PCT/US2021/042896, Written Opinion mailed Nov. 8, 2021", 4 pgs.

Yunbo, Li, et al., "Error recovery for non-STR Mld", IEEE 802.1 I-20/1062r0, (Jul. 12, 2020).

"European Application Serial No. 21845855.2, Response filed May 8, 2025 to Extended European Search Report mailed Oct. 21, 2024", 18 pgs.

"Japanese Application Serial No. 2022-564730, Notification of Reasons for Rejection mailed Jun. 17, 2025", W English Translation, 5 pgs.

Yongho, Seok, "Multi-Link Operation Simulation Methodology", (MediaTek) in IEEE 802.11be WLANs, [Online] Retrieved from the internet: https://mentor.ieee.org/802.11/dcn/19/11-19-1927-01-OObe-multi-linkoperation-simulation-methodology.pptx, (Jan. 30, 2020), 7 pgs.

* cited by examiner

| Element ID | Length | QoS Info |
|---|---|---|
| 1 | 1 | 1 |

QoS Capabilities Element

FIG. 1

| B0 | B1 | B2 | B3 | B4 | B5 B6 | B7 | B8 | B9 B15 |
|---|---|---|---|---|---|---|---|---|
| AC_VO U-APSD Flag | AC_VI U-APSD Flag | AC_BK U-APSD Flag | AC_BEU-APSD Flag | Q-ACK | Max SP Length | More Data ACK | QoS Redundancy | Reserved |
| 1 | 1 | 1 | 1 | 1 | 2 | 1 | 1 | 7 |

QoS Info Field for a STA

FIG. 2A

| B0 B3 | B4 | B5 | B6 | B7 | B8 | B9 B15 |
|---|---|---|---|---|---|---|
| EDCA Parameter Set Update Count | Q-ACK | Queue Request | TXOP Request | Reserved | QoS Redundancy | Reserved |
| 4 | 1 | 1 | 1 | 1 | 1 | 7 |

QoS Info Field for an AP

FIG. 2B

| Element ID | Length | Extended Capabilities |
|---|---|---|
| 1 | 1 | VARIABLE |

OCTETS:

Extended Capabilities Element format

FIG. 3

5.2.2.2 SEMANTICS OF THE SERVICE PRIMITIVE

The parameters of the primitive are as follows:
MA-UNITDATA.request (
    source address,
    destination address,
    routing information,
    data,
    priority,
    service class
    )

FIG. 4

SIGNALLING SUPPORT FOR REDUNDANCY CAPABILITIES FOR EHT

PRIORITY CLAIMS

This application is a U.S. National Stage Filing under 35 U.S.C. 371 from International Application No. PCT/US2021/042896, filed Jul. 23, 2021 and published in English as WO 2022/020677 on Jan. 27, 2022, 2022, which claims priority to U.S. Provisional Patent Application Ser. No. 63/056,019, filed Jul. 24, 2020, and U.S. Provisional Patent Application Ser. No. 63/133,645, filed Jan. 4, 2021 which are incorporated herein by reference in their entireties.

TECHNICAL FIELD

Embodiments pertain to wireless communications. Some embodiments relate to IEEE P802.11be and extremely-high throughput (EHT) networks. Some embodiments apply to signalling redundancy capability. Some embodiments relate to multi-link device (MLD) operation.

BACKGROUND

One issue with communicating data over a wireless network is redundancy. Redundancy is an integral part of Time Sensitive Networking and it contributes to meeting high reliability and bounded latency requirements for time-sensitive traffic. In a wireless network a signaling mechanism is needed in order for the peers to recognize support or otherwise for redundancy. Currently, there is no standard mechanism to indicate support for redundancy in a wireless network. Thus, there are general needs for indicating support for redundancy.

BRIEF DESCRIPTION OF THE DRAWINGS

FIG. 1 illustrates a QoS Capabilities Element, in accordance with some embodiments.

FIG. 2A illustrates a QoS Info Field for a STA, in accordance with some embodiments.

FIG. 2B illustrates a QoS Info Field for an AP, in accordance with some embodiments.

FIG. 3 illustrates an Extended Capabilities Element, in accordance with some embodiments.

FIG. 4 illustrates semantics of the service primitive, in accordance with some embodiments.

DETAILED DESCRIPTION

Figure 5:
FIG. 5 illustrates an Intra-Access Priority field, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to an extremely high-throughput (EHT) station (STA). In these embodiments, the EHT STA may be configured to encode a management frame for transmission. The management frame may be encoded to include a quality-of-service (QoS) capability element that includes a QoS information field configured to signal QoS redundancy capability. In these embodiments, the EHT STA may set a QoS redundancy bit in the QoS information field of the QoS capabilities element to indicate (i.e., signal) that the EHT STA supports redundancy for QoS data frames. In some of these embodiments, the EHT STA may include an Extended Capabilities element in the management frame and set a new redundancy indicator bit in the Extended Capabilities element to indicate (i.e., signal) that the EHT STA supports redundancy for a select subset of IEEE802.11 management frames. In these embodiments, this signalling may allow peer stations to recognize when an EHT STA supports redundancy for QoS traffic and supports redundancy for certain management frames. This may help provide for high reliability and bounded latency requirements for time-sensitive traffic, although the scope of the embodiments is not limited in this respect. These embodiments are described in more detail below.

In some embodiments, if the EHT STA indicated support for redundancy for QoS data frames, the EHT STA may encode duplicates of QoS data frames for transmission when indicated in a MAC header of the QoS data frame or for a traffic stream based on a traffic stream identifier (TID). In these embodiments, the EHT STA may decode duplicates of QoS data frames received from another EHT STA when indicated in a MAC header of the QoS data frame or for a traffic stream based on a TID.

In some embodiments, when the EHT STA indicated support for redundancy for a subset of management frames, the EHT STA may encode duplicates of management frames of the subset for transmission when indicated in a MAC header of the management frame or based on an agreement with another EHT STA (e.g., an EHT access point (AP) STA). In some embodiments, the EHT STA may decode duplicates of management frames of the subset received from another EHT STA, when indicated in a MAC header of the management frame or based on an agreement with the other EHT STA.

In some embodiments, the EHT STA may be configured to refrain from setting the QoS redundancy bit in the QoS information field of the QoS capabilities element when the EHT STA does not support redundancy for QoS data frames. In some embodiments, the EHT STA may refrain from setting the redundancy indicator bit in the Extended Capabilities element when the EHT STA does not support redundancy for the subset of management frames.

In some embodiments, the EHT STA is configured to negotiation a block-acknowledge (BA) agreement with another EHT STA. The BA agreement may indicate whether the QoS data frames are to be duplicated and/or whether the subset of management frames are to be duplicated.

In some embodiments, when the EHT STA is operating as an EHT access point STA (AP STA), the management frame may be a beacon frame and the subset of management frames comprises at least beacon frames although the scope of the embodiments is not limited in this respect as other management frames may also be included. In some embodiments, when the EHT STA is operating as a non-AP STA, the management frame may be an association request frame or reassociation request frame.

In these embodiments, the QoS redundancy bit in the QoS information field of the QoS capabilities element may be used to indicate whether the EHT STA supports redundancy. Whether or not the EHT STA actually needs to duplicate the data frame (per frame based) maybe indicated by one bit in the MAC header traffic stream (per TID based), which maybe be pre-negotiated between the AP and STA. Whether or not the EHT STA actually needs to duplicate the management frame can be predefined, pre-negotiated or indicated by one bit in the MAC header. In some embodiments, the redundant transmission requirement may be maybe indicated by one bit in the MAC header or indicated by a redundancy header while integrated with a redundancy EtherType protocol, such as 802.1CB, although the scope of the embodiments is not limited in this respect.

In some embodiments, for multi-link device (MLD) operation (MLO) when the EHT STA is operating as a STA affiliated with a multi-link device (MLD), the EHT STA may be configured to encode a management frame to include an Intra-Access Category Priority element to indicate a redundant transmission requirement. In these embodiments, the MLD may comprising a plurality of affiliated STAs. In some embodiments, based on the indication of the redundant transmission requirement, the EHT STA may be configured to cause the MLD to initiate redundant packet transmission over more than one link with another MLD. These embodiments allow IEEE 802.11 networks to provide low latency service with high reliability and will enable TSN services and ultra-reliable low latency communications (URLLC) over 802.11be.

In some of these embodiments, the redundant transmission requirement is for a particular access category or traffic stream. In some embodiments, the management frame that is encoded to include the Intra-Access Category Priority element comprises one or more of an add traffic stream (ADDTS) Request frame, a quality-of-service (QoS) Map Configure frame and a Stream Classification Service (SCS) Request frame.

In some embodiments, the redundant transmission requirement is a requirement of an established block acknowledge (BA) agreement that allows QoS Data frames of a TID, aggregated within A-MPDUs, to be exchanged between the two MLDs on an available link.

In some embodiments, the EHT STA may be configured to encode the Intra-Access Category Priority element to include a redundancy indication (RI) subfield in an Intra-Access Priority field within the Intra-Access Category Priority element to indicate the redundant transmission requirement. In some embodiments, when set, the RI indicates that a particular traffic stream (TS) is to be duplicated and transmitted over more than one link.

In some embodiments, the MLD may be either a STA MLD or an AP MLD. In some embodiments, the MLD may have a single medium access control (MAC) service access point (SAP) to logical link control (LLC), which includes one MAC data service.

Some embodiments are directed to non-transitory computer-readable storage medium that stores instructions for execution by processing circuitry of an extremely high-throughput (EHT) station (STA).

Some embodiments are directed to extremely high-throughput (EHT) station (STA) configured for multi-link device (MLD) operation (MLO) when the EHT STA is operating as a STA affiliated with a multi-link device (MLD). In these embodiments, the MLD may comprise a plurality of affiliated STAs. In these embodiments, the EHT STA may be configured to encode a management frame to include an Intra-Access Category Priority element to indicate a redundant transmission requirement. Based on the indication of the redundant transmission requirement, the EHT STA may be configured to cause the MLD to initiate redundant packet transmission over more than one link with another MLD. These embodiments are described in more detail below.

Example embodiments of the present disclosure relate to systems, methods, and devices for a framework for signaling support for Redundancy Capabilities in a Wireless Network. In some embodiments, a redundancy capabilities system may facilitate a mechanism to signal the following: Support for redundancy for quality of service (QoS) traffic in the QoS Capabilities element, and support for redundancy for select subset of IEEE 802.11 Management frames in the extended capabilities element. With the proposed mechanism, two peer devices can discover support for redundancy and as a result enable redundant paths to provide high reliability and bounded latency for the transmission of payloads over the IEEE 802.11 medium.

In one or more embodiments, a redundancy capabilities system may facilitate that the QoS Capability element is included in Beacon frames when it is transmitted by an AP that is QoS Capable; and in [Re]Association Request frames when it is transmitted by a STA that is QoS Capable.

FIG. 1 illustrates a QoS Capabilities Element, in accordance with some embodiments. In one or more embodiments, the QoS Info field needs to be extended to 2 octets in length in order to accommodate an additional bit required to signal QoS redundancy capability. In one or more embodiments, a redundancy capabilities system may facilitate the definition of QoS Info field when the transmitter is a STA. FIG. 2A illustrates a QoS Info Field for a STA, in accordance with some embodiments. In one or more embodiments, a redundancy capabilities system may facilitate the definition of QoS info field when the transmitter is an AP. FIG. 2B illustrates a QoS Info Field for an AP, in accordance with some embodiments. In one or more embodiments, a redundancy capabilities system may facilitate the QoS Redundancy bit is set to 1 to indicate that the implementation supports redundancy for QoS data frames and 0 otherwise.

In one or more embodiments, a redundancy capabilities system may facilitate a new bit is defined in the Extended Capabilities element to indicate support for redundancy to a select subset of IEEE802.11 Management frames. If this bit is set to 1, it indicates that the underlying implementation supports redundancy for the select subset of IEEE802.11 Management frames, and 0 otherwise. FIG. 3 illustrates an Extended Capabilities Element, in accordance with some embodiments.

One of the main challenges for next-generation Wi-Fi technology is to support Time-Sensitive Networking (TSN) and Real-Time applications (RTA), which require high reliability with low bounded latency and jitter. Defining better support for TSN and RTA application are part of the scope of the next generation Wi-Fi being developed by the 802.11be task group.

Multi-link operation (MLO) is under definition in 802.11be, but there is no mechanism for applications (upper layers) to request/negotiate a service that delivers redundant data frames over more than one link to achieve high reliability and low latency bound by using this multi-link capability. A consensus is achieved in 802.11be that the established block ACK (BA) agreement allows the QoS Data frames of the TID, aggregated within the A-MPDUs, to be exchanged between the two MLDs on any available link. This means that data frames may be transmitted on any available links, but no specific rules/requirements for implementing the redundancy capability are defined in 11be. To support redundancy in 802.11be using multi-link operation, the following capabilities still need to be defined:

1) An interface and mechanism to indicate the redundant transmission requirement.

2) Rules for the 802.11be MLD (multi-link device) to handle a frame or traffic stream with redundancy requirement indication including frame duplication and transmission over more than one available links.

Embodiments disclosed herein provide one or more approaches to indicate the redundancy requirement by using the Intra-Access Category Priority element. Some embodiments propose reuse of the Intra-Access Category Priority element optionally present in ADDTS Request, QoS Map Configure, or SCS (Stream Classification Service) Request frame. This element is used by a STA to convey to an AP about the relative priority of streams within an AC.

There are three different approaches to indicate the redundancy requirement, which including:

1) Redundancy requirement may be included as part of low latency or other QoS signaling mechanism to identify data flows that need the redundancy requirement. The redundancy requirement may also be identified by a certain TID (existing or new TID value) that is associated to a traffic flow that needs high reliability.

2) Enhancements to IEEE 802.1-layer protocols.

High-availability Seamless Redundancy (HSR), Parallel Redundancy Protocol (PRP) and 802.1CB are redundancy protocols those are defined for time sensitive network to improve reliability with bounded latency. After applying any of these redundancy protocols over 802.1 layer, the packet forwarded down to the 802.11 layer will be attached with a redundancy tag as an Ether Type. Therefore, for the device supporting 802.1 layer redundancy protocol, this redundancy protocol may be applied to attach a redundancy tag to indicate the redundancy requirement. As a result, the 802.11be MLD can based on the redundancy tag to do frame duplication and transmission over more than one available links.

Note: Other QoS requirement related parameters, such as the packet deliver rate, latency bound, can able be defined using the reserved bits in the Redundancy tag information field.

3) Add the redundancy requirement in the MA-UNITDATA. Request of the 802.11 MAC data service primitives. FIG. 4 illustrates semantics of the service primitive, in accordance with some embodiments.

Example embodiments of the present disclosure relate to systems, methods, and devices for using multi-link to enable redundancy in 802.11be to support low latency reliable service. In one embodiment, a redundancy system may facilitate an approach for reusing Intra-Access Category Priority element to indicate the redundancy requirement for the multi-link device (MLD) to initiate redundant packet transmission over more than one available links. This may enable 802.11 networks to provide low latency service with high reliability. This new capability is expected to be one of the main new features in 802.11be and will enable time-sensitive networking (TSN) services and ultra-reliable low latency communications (URLLC) over 802.11be.

High-availability Seamless Redundancy (HSR), Parallel Redundancy Protocol (PRP) and 802.1CB are redundancy protocols those are defined for time sensitive network to improve reliability with bounded latency. After applying any of these redundancy protocols over 802.1 layer, the packet forwarded down to the 802.11 layer will be attached with a redundancy tag as an Ether Type (see FIG. 4). Therefore, for the device supporting layer redundancy protocol, this redundancy protocol may be applied to attach a redundancy tag to indicate the redundancy requirement. As a result, the 802.11be MLD can based on the redundancy tag to do frame duplication and transmission over more than one available links.

FIG. 5 illustrates an Intra-Access Priority field, in accordance with some embodiments. Some embodiments disclosed herein define the redundancy requirement using one of the reserved bits between B5-B7 in the Intra-Access Priority field within the Intra-Access Category Priority element. As shown in FIG. 5, as an illustration, bit 5 (B5) may be defined as the "Redundancy indication" (RI) subfield. When it is equal to 1, it indicates that this TS needs to be duplicated and transmitted over more than one available links.

In one or more embodiments, a redundancy may reuse the B0-B2 bits in the Intra-Access Priority field to define a "TID" value instead of the baseline definition of "User Priority."

It has been proposed to define new 8 TIDs (TID 8 to TID 15). The new 8 TIDs are used to differentiate the EHT traffic that requires QoS management (specifically, low latency, jitter, frame rate, etc.) from the conventional VI, VO, BE, and BK traffic identified by lower 8 TIDs (TID 0 to TID 7).

In essence, a TID value in the B0-B2 subfield indicates the TID of an MSDU or A-MSDUs of a stream to which this Intra-Access Category Priority element relates to.

In one or more embodiments, a redundancy may facilitate that the primary EDCA queue for the traffic identified by the TID subfield in the Intra-Access Priority field is set to AC_VO. When the value in the Alternate Queue subfield is set to 0, then the traffic corresponding to the TID in the B0-B2 subfield is queued in AC_VO queue. When the Alternate Queue subfield is set to 1, then an alternate EDCA queue is used for that AC. This might assist in queuing optimization, when the primary queue is non-empty.

In one or more embodiments, a redundancy may facilitate that if the B5 (Redundancy) value is set to 1, then the Drop Eligibility subfield shall be set to 0. In other words, for traffic that requires redundancy, the packet shall not be dropped due to resource limitations.

In one or more embodiments, a redundancy may facilitate that the subfield in B6 bit position is defined as "Access Policy." When this bit is set to 1, the channel access corresponding to the traffic with TID value indicated in bits B0-B2 shall be Trigger-based (for non-AP MLD) or using DL MU PPDUs (for AP MLD). When this bit is set to 0, the preference is selected between EDCA-based access or Trigger-based access, based on the QoS requirements.

When the SCS (or MSCS) Descriptor element consists of the Intra-Access Category Priority element, then the classifier parameter (User Priority) in the Frame Classifier field of TCLAS element is ignored. In addition, the UP subfield in TS Info field of TSPC element is reserved.

In case the Intra-Access Category Priority element is aggregated with the MSCS Descriptor element, then the "User Priority Bitmap" subfield in the MSCS Descriptor element is proposed to be reused as the "TID Priority Bitmap" subfield. In some embodiments, each bit in the bitmap corresponds to a TID, with the least significant bit corresponding to TID value of 15, and the most significant bit corresponding to TID value of 8. In some embodiments, a value of 1 in a bit position in the bitmap indicates that the corresponding TID is used when assigning a TID to streams classified by MSCS; a value of 0 in a bit position indicates that the corresponding TID is not used for this purpose. In some embodiments, the TID value in the Bitmap that has a value of 1 corresponds to the TID value indicated in the Intra-Access Category Priority element.

For device-centric QoS management, following an MSCS (or SCS) Request (carrying the MSCS or SCS Descriptor element) and Response frame exchange between a non-AP MLD and AP MLD, a STA (or non-AP MLD) may indicate the preferred TID value (bit in the Bitmap set to 1) in its UL PPDU in order for the AP MLD to mirror the corresponding TID in its DL PPDUs. The AP and non-AP MLD associates a redundancy requirement to the traffic stream as part of the QoS negotiation. For the traffic stream with redundancy requirement, the non-AP MLD will also add an intra-access category priority element with B0-B2 equal to the corresponding preferred TID of the traffic steam, B4 equal to 0 and B5 equal to 1, in the MSCS request frame. Note, it can also be presented in QoS Map Configure, or ADDTS request frame. As a result, the AP MLD will trigger redundant data transmission in the DL PPDUs for the corresponding TID.

For network-centric QoS management, if the AP sends an MSCS Descriptor element (in Request frame) or the Descriptor element included in Response frame, then the AP might indicate the preferred TID value (bit in the Bitmap set to 1) in its DL PPDU in order for the non-AP MLD to mirror the corresponding TID in its UL PPDUs. For the traffic stream with redundancy requirement, the AP MLD will also add an intra-access category priority element with B0-B2 equal to the corresponding preferred TID of the traffic steam, B4 equal to 0 and B5 equal to 1, in the MSCS request frame. Note, it can also be presented in QoS Map Configure, or ADDTS request frame. As a result, the non-AP MLD will trigger redundant data transmission in the UL PPDUs for the corresponding TID.

When the MAC SAP receives a MSDU, if the related intra-access category priority element with the corresponding TID for this MSDU is set with B5=1, the MAC SAP will schedule the transmission of this MSDU over more than one available links before the reception of the acknowledgement. The number of links is an implementation decision.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties.

The Extended Capabilities element (FIG. 3) carries information about the capabilities of a STA that augment the capabilities specified in the Capability Information field. The Extended Capabilities field is a bit field indicating the extended capabilities being advertised by the STA transmitting the element.

In some embodiments, a station (STA) may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An AP MLD (A MLD) may refer to an AP device, where each STA affiliated with the STA MLD is an AP. A non-AP ML device (non-AP MLD) maybe an A MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links concurrently without having to drop one communication link to allow for establishing another communication link.

Multi-link operation (MLO) is an important 802.11be feature, which allow a device to communicate to another device using multiple links on different channels/bands. A device supporting multiple links is a MLD.

Figure 6:
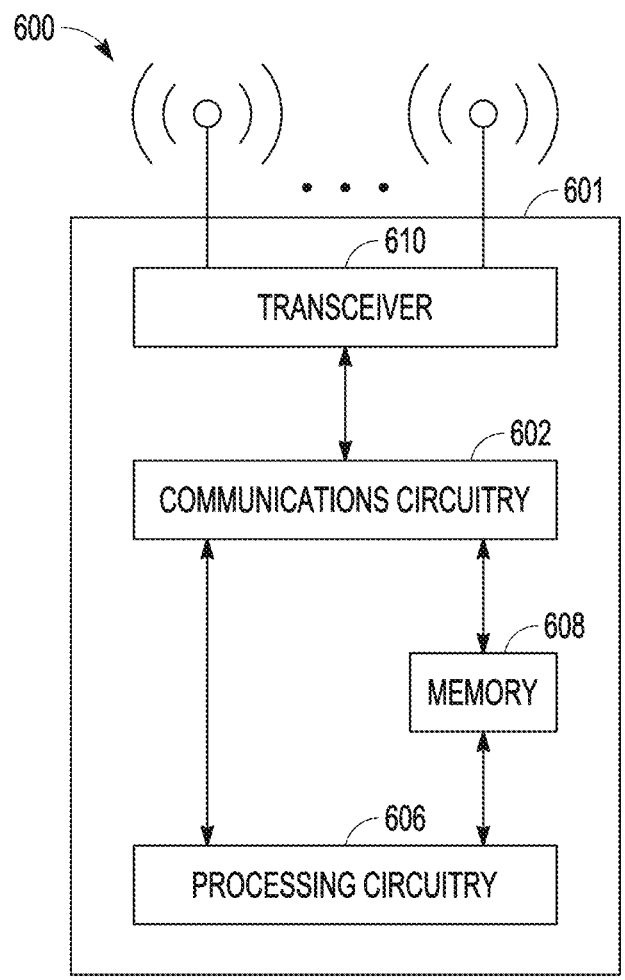
FIG. 6 illustrates a functional block diagram of a wireless communication device, in accordance with some embodiments.

In one embodiment, FIG. 6 illustrates a functional block diagram of a communication station (STA) that may be suitable for use as an AP STA, a non-AP STA or other user device in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-throughput (EHT) station (STA), the apparatus comprising: processing circuitry and memory, wherein the processing circuitry is configured to:
    encode a management frame for transmission, the management frame encoded to include a quality-of-service (QoS) capability element that includes a QoS information field configured to signal QoS redundancy capability;
    set a QoS redundancy bit in the QoS information field of the QoS capabilities element to indicate that the EHT STA supports redundancy for QoS data frames; and
    generate an Extended Capabilities element to include in the management frame and set a redundancy indicator bit in the Extended Capabilities element to indicate that the EHT STA supports redundancy for a subset of management frames.

2. The apparatus of claim 1, wherein if the EHT STA indicated support for redundancy for QoS data frames, the processing circuitry is to configure the EHT STA to encode duplicates of QoS data frames for transmission when indicated in a MAC header or for a traffic stream based on a traffic stream identifier (TID).

3. The apparatus of claim 2, wherein when the EHT STA indicated support for redundancy for a subset of management frames, the processing circuitry is to configure the EHT STA to encode duplicates of management frames of the subset for transmission when indicated in a MAC header of the management frame or based on an agreement with another EHT STA.

4. The apparatus of claim 3, wherein the processing circuitry is configured to refrain from setting the QoS redundancy bit in the QoS information field of the QoS capabilities element when the EHT STA does not support redundancy for QoS data frames, and
    wherein the processing circuitry is configured to refrain from setting the redundancy indicator bit in the Extended Capabilities element when the EHT STA does not support redundancy for the subset of management frames.

5. The apparatus of claim 4, wherein EHT STA is configured to negotiation a block-acknowledge (BA) agreement with another EHT STA, the BA agreement indicating whether the QoS data frames are to be duplicated and/or whether the subset of management frames are to be duplicated.

6. The apparatus of claim 5, wherein when the EHT STA is operating as an EHT access point STA (AP STA), the management frame is a beacon frame, and the subset of management frames comprises at least beacon frames.

7. The apparatus of claim 6, wherein when the EHT STA is operating as a non-AP STA, the management frame is an association request frame or reassociation request frame.

8. The apparatus of claim 1, wherein for multi-link device (MLD) operation (MLO) when the EHT STA is operating as a STA affiliated with a multi-link device (MLD), the MLD comprising a plurality of affiliated STAs, the processing circuitry is configured to encode a management frame to include an Intra-Access Category Priority element to indicate a redundant transmission requirement, and
    wherein based on the indication of the redundant transmission requirement, the processing circuitry is configured to cause the MLD to initiate redundant packet transmission over more than one link with another MLD.

9. The apparatus of claim 8, wherein the redundant transmission requirement is for a particular access category or traffic stream.

10. The apparatus of claim 9, wherein the management frame that is encoded to include the Intra-Access Category Priority element comprises one or more of an add traffic stream (ADDTS) Request frame, a quality-of-service (QoS) Map Configure frame and a Stream Classification Service (SCS) Request frame.

11. The apparatus of claim 10, wherein the redundant transmission requirement is a requirement of an established block acknowledge (BA) agreement that allows QoS Data frames of a TID, aggregated within A-MPDUs, to be exchanged between the two MLDs on an available link.

12. The apparatus of claim 9, wherein the processing circuitry is configured to encode the Intra-Access Category Priority element to include a redundancy indication (RI) subfield in an Intra-Access Priority field within the Intra-Access Category Priority element to indicate the redundant transmission requirement, and wherein when set, the RI indicates that a traffic stream (TS) is to be duplicated and transmitted over more than one link.

13. The apparatus of claim 9, wherein the MLD is either a STA MLD or an AP MLD, wherein the MLD has a single medium access control (MAC) service access point (SAP) to logical link control (LLC), which includes one MAC data service.

14. A non-transitory computer-readable storage medium that stores instructions for execution by processing circuitry of an extremely high-throughput (EHT) station (STA), wherein the processing circuitry is configured to:

encode a management frame for transmission, the management frame encoded to include a quality-of-service (QoS) capability element that includes a QoS information field configured to signal QoS redundancy capability;

set a QoS redundancy bit in the QoS information field of the QoS capabilities element to indicate that the EHT STA supports redundancy for QoS data frames; and generate an Extended Capabilities element to include in the management frame and set a redundancy indicator bit in the Extended Capabilities element to indicate that the EHT STA supports redundancy for a subset of management frames.

15. The non-transitory computer-readable storage medium of claim 14, wherein if the EHT STA indicated support for redundancy for QoS data frames, the processing circuitry is to configure the EHT STA to encode duplicates of QoS data frames for transmission when indicated in a MAC header or for a traffic stream based on a traffic stream identifier (TID).

16. The non-transitory computer-readable storage medium of claim 15, wherein when the EHT STA indicated support for redundancy for a subset of management frames, the processing circuitry is to configure the EHT STA to encode duplicates of management frames of the subset for transmission when indicated in a MAC header of the management frame or based on an agreement with another EHT STA.

17. The non-transitory computer-readable storage medium of claim 16, wherein the processing circuitry is configured to refrain from setting the QoS redundancy bit in the QoS information field of the QoS capabilities element when the EHT STA does not support redundancy for QoS data frames, and wherein the processing circuitry is configured to refrain from setting the redundancy indicator bit in the Extended Capabilities element when the EHT STA does not support redundancy for the subset of management frames.

18. The non-transitory computer-readable storage medium of claim 17, wherein EHT STA is configured to negotiation a block-acknowledge (BA) agreement with another EHT STA, the BA agreement indicating whether the QoS data frames are to be duplicated and/or whether the subset of management frames are to be duplicated.

19. An apparatus of an extremely high-throughput (EHT) station (STA), the apparatus comprising: processing circuitry and memory, wherein for multi-link device (MLD) operation (MLO) when the EHT STA is operating as a STA affiliated with a multi-link device (MLD), the MLD comprising a plurality of affiliated STAs, the processing circuitry is configured to encode a management frame to include an Intra-Access Category Priority element to indicate a redundant transmission requirement, and wherein based on the indication of the redundant transmission requirement, the processing circuitry is configured to cause the MLD to initiate redundant packet transmission over more than one link with another MLD.

20. The apparatus of claim 19, wherein the redundant transmission requirement is for a particular access category or traffic stream.

* * * * *